United States Patent
Bachar et al.

(10) Patent No.: US 7,164,648 B1
(45) Date of Patent: Jan. 16, 2007

(54) ULTRA HIGH SPEED CROSSTALK CANCELLING TECHNIQUE

(75) Inventors: Yuval Bachar, Sunnyvale, CA (US); Gopakumar Parameswaran, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1028 days.

(21) Appl. No.: 10/207,441

(22) Filed: Jul. 26, 2002

(51) Int. Cl.
*H04J 1/12* (2006.01)
(52) U.S. Cl. ........................ 370/201; 370/286
(58) Field of Classification Search ................ 370/201, 370/286, 289–291, 280, 282; 375/346, 350, 375/219
See application file for complete search history.

(56) References Cited

U.S. PATENT DOCUMENTS 5,887,032 A * 3/1999 Cioffi ......................... 375/257
6,236,645 B1 * 5/2001 Agazzi ....................... 370/286
6,829,314 B1 * 12/2004 Zortea et al. ............... 375/346
7,046,751 B1 * 5/2006 Kantschuk et al. ......... 375/346

OTHER PUBLICATIONS

"The Real Truth About Crosstalk", originally published in *Electronic Design Magazine*, Aug. 1997, retrieved from the Internet on Oct. 27, 2003: <URL:http://signalintegrity.com/Pubs/straight/crosstalk.htm>.

* cited by examiner

*Primary Examiner*—Brenda Pham
(74) *Attorney, Agent, or Firm*—Charles E. Krueger

(57) ABSTRACT

An ultra-fast crosstalk cancellation technique characterizes crosstalk with a sample set representing NEXT generated by a single transmitted bit. During operation, transmit bit values of transmitted bits are saved in a transmit bit shift register and used to weight crosstalk samples corresponding to a stored transmit value. The weighted transmit samples are summed to generate a crosstalk cancellation signal which is subtracted from a received signal to remove NEXT.

10 Claims, 4 Drawing Sheets b8

| A1 | A2 | A3 | A4 | b7

| B1 | B2 | B3 | B4 | b6

| C1 | C2 | C3 | C4 | b5

| D1 | D2 | D3 | D4 | t1    t2    t3    t4

FIG. 7

ULTRA HIGH SPEED CROSSTALK CANCELLING TECHNIQUE

BACKGROUND OF THE INVENTION

As part of the development of the high speed router platform program, the GSR (Gigabit Switch Router) backplanes are required to speed up to a 5 Gbit/sec data transfer rate from the 1.25 Gbit/sec rate that the backplanes were designed for.

Dealing with such speed is very challenging and requires special techniques to deal with problems beyond just simple signal integrity. At high data transfer rates of 2.5 Gbit/sec or more, most of the noise injected into the signal is crosstalk caused at the connector.

The main noise contributor is near-end crosstalk (NEXT). The terminology of NEXT will be briefly explained with reference to FIG. 1 which depicts a transmitter (Tx) and Tx line, a Receiver (Rx) and Rx line, and a connector. In this case the transmitter is the crosstalk aggressor and the receiver is the crosstalk victim. Crosstalk is the same on all Rx channels from each aggressor. Generally, the Tx and Rx lines are interleaved on the backplane so that there are 2 aggressors for all the Rx channels except one. The channel at the end has one aggressor.

One of the only effective ways to deal with high speed connector crosstalk is with crosstalk cancelling. Today's backplane and connector technology cannot scale to the required 5 Gbit/sec rate unless sophisticated DSP based technology is used. However, DSP technology is power hungry and complex to implement.

BRIEF SUMMARY OF THE INVENTION

In one embodiment of the invention, a mix of analog circuits and digital circuits is used to sample the signals, process them, and then do post processing cancelling.

In another embodiment of the invention, the method has a learning aspect at power-on that can be done off-line and uploaded to the crosstalk canceller as a parameter array. The parameter array correlates to the physical dimensions of the channels and not the environmental conditions.

In another embodiment of the invention, samples are taken about a peak detected during a particular bit period. The sampling rate is a multiple of the bit rate and samples are grouped by bit period.

In another embodiment, each group of samples is weighted by a bit value that generates the crosstalk signal being received, and corresponding samples from each weighted subgroup are summed to form crosstalk cancellation sub-signals.

In another embodiment of the invention, the window for grouping the bits can be slid to compensate for errors in the peak detection time.

In another embodiment of the invention, the system is implemented in low-power Bi-CMOS.

Other features and advantages of the invention will be apparent in view of the following detailed description and appended drawings.

BRIEF DESCRIPTION OF THE DRAWINGS

FIG. 7 is diagram depicting the contributions of the crosstalk signal at single point in time.

DETAILED DESCRIPTION OF THE INVENTION

The invention will now be described, by way of example, not limitation, with reference to various embodiments. The described embodiment is implemented in a backplane system utilized on a routing platform to transmit and receive data at 5 Gbit/sec. However, the invention is not limited to use in routing platforms but has general utility in high speed data transfer systems.

Figure 1:
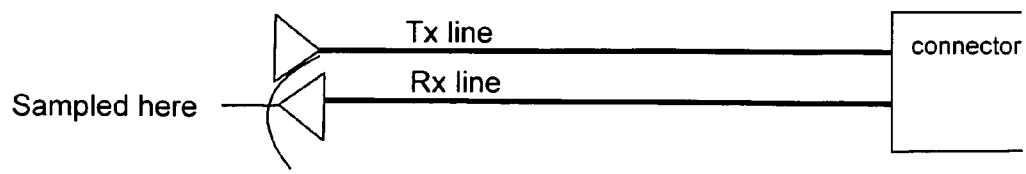
FIG. 1 is a block diagram depicting the parameters of NEXT.
Figure 2:
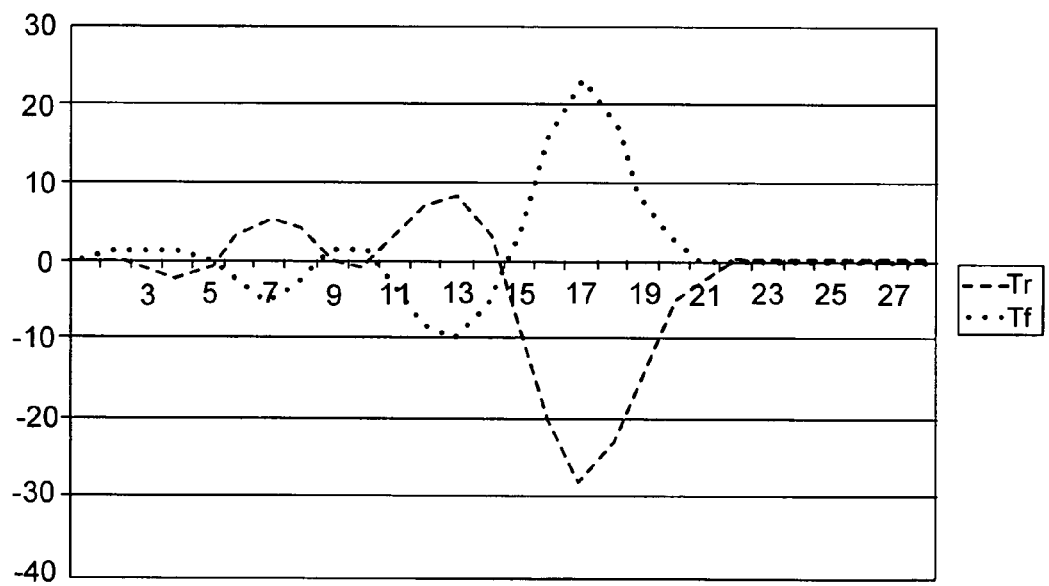
FIG. 2 is a graph depicting the NEXT for a single transition.

FIG. 2 is a graph depicting the NEXT on the Rx line caused by a single transition on the Tx line. In this example, the data rate is 5 Gbit/sec resulting in a bit period of 200 ps. In this graph, the time unit is sampling periods of 50 ps. and the amplitude unit is millivolts (mV). Thus, in this example there are four sampling periods for each bit clock.

Another important factor of NEXT is that each transition on the aggressor creates a NEXT signal that has similar characteristics such as the duration of the signal and the amplitude of each sampling point. Also the NEXT created by the −ve transition is an inverted version of the NEXT created by the +ve transition. This is shown in FIG. 2.

Since the NEXT created by each transition lasts more than one bit period and travels towards the source, the NEXT from multiple transitions may add up to generate resultant near end crosstalk. These properties are used to reconstruct the NEXT for a transmit sequence.

Since, in this example, the crosstalk due to a single transition lasts for 1,000 ps., five 200 ps. bit periods are required to collect all the information to account for all tail effects of the transition. It may also be required to gather information for one bit period before and after to do further tuning explained below. Additionally, another four bit periods are required to account for the PCB round trip delay (assuming a trace length less than 2"). An additional budget of bit periods may be needed to account for package and other circuit delays.

Figure 3:
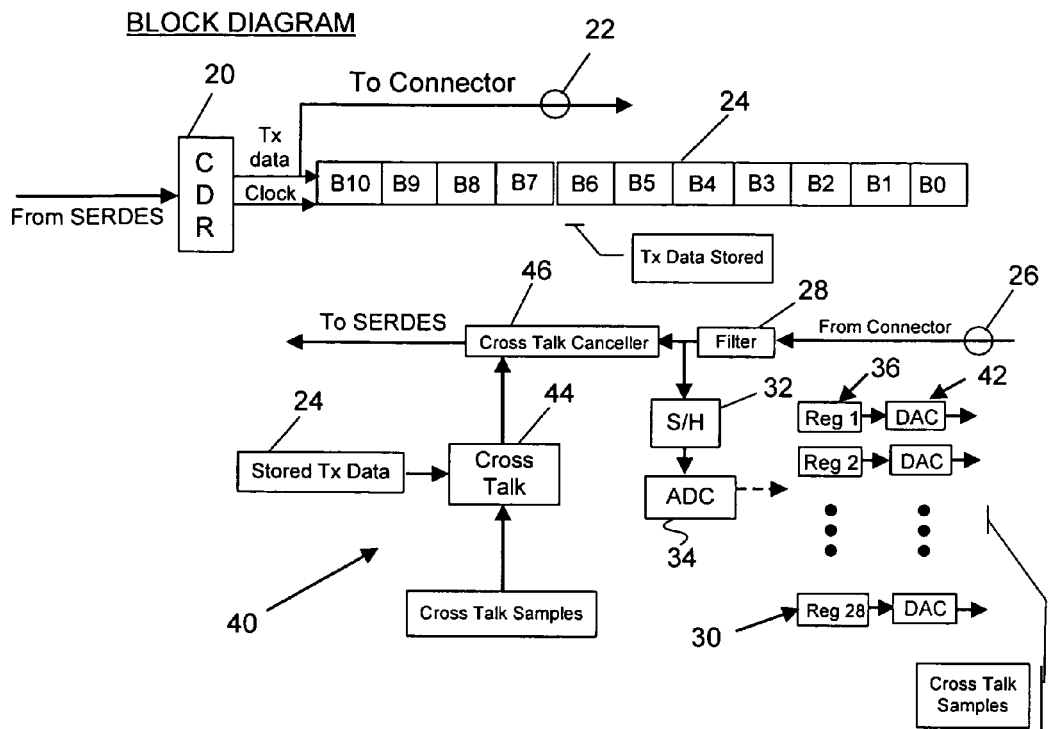
FIG. 3 is a block diagram of a system for implementing an embodiment of the invention.

FIG. 3 is a block diagram of a system for implementing an embodiment of the invention. In FIG. 3, a signal to be transmitted at 5 Gbit/sec is input to the CDR (Clock and Data Recovery) unit 20. The Tx data is output on the Tx line 22 connected to a connector and input to the B10 position of a transmit shift register 24, shifted by the transmit clock every 200 ps., for storing the bit values transmitted.

The Rx line 26 is connected to a filter 28 having outputs coupled to crosstalk characterization system 30 and a crosstalk cancellation system 40. The crosstalk characterization system 30 includes a sample and hold circuit (S/H) 32, and analog to digital converter (ADC) 34, and a plurality of registers 36 (in this example 28 registers). The crosstalk cancellation system 40 includes a plurality of digital to analog converters (DACs) 42, each coupled to a respective register 36, the transmit shift register 24, a timing and amplitude control block 44, and mixer circuit 46 for subtracting the cancellation signal from the received signal.

Figure 4:
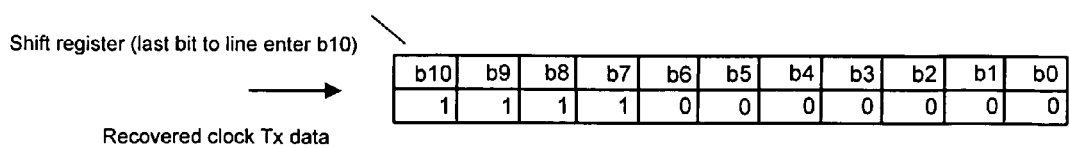
FIG. 4 is a block diagram of a shift register holding recovered clock data.

The operation of the crosstalk characterization will now be described with reference to FIGS. 1–4. The crosstalk is characterized for a single transition and compensation for multiple transitions will be described below. The first step is to detect the peak of the crosstalk pulse. In this example, it is assumed that the peak is likely to be detected about 600 ps. (assuming a minimum one-inch backplane trace) after a bit is transmitted. Referring to FIG. 4, in the timing shift register the location of the furthest right "1" bit value indicates the number of clock periods elapsed since the transmission of the bit. Thus, in FIG. 4 when b7 transitions to "1" 600 ps. have elapsed and sampling of Rx signal commences.

Figure 5:
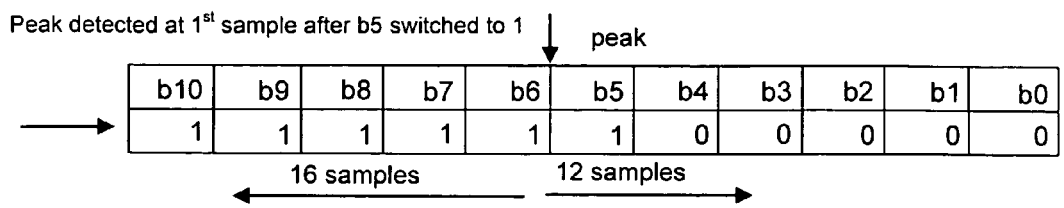
FIG. 5 is a block diagram of a shift register holding recovered clock data depicting the location of a crosstalk signal peak.

In the example depicted in FIG. 5, the peak is detected after b5 switches to "1". Referring back to FIG. 2, note that the crosstalk pulse begins about 12 sample periods before the peak and continues for about 16 sample periods after the pulse. Accordingly, 28 samples will be taken distributed about the peak as depicted in FIG. 5.

A method for collecting 12 samples before and 16 samples after peak will now be described. Since the sampling points are separated by only 50 ps. it may be necessary to collect the samples from different transition events (by skewing the sampling as is done with an oscilloscope). The single transitions should be kept far apart to allow residues from each transition to die down. Samples might have to be collected as differential crosstalk signal across Rx+/Rx−.

A new signal is transmitted and sampling begins when b8 transitions to "1" which is three bit periods or 12 sample points before the peak occurs when b5 transitions to "1". Sampling continues until b2 transitions to "1" which is four bit periods after the peak, so that 16 samples are taken after the peak.

Alternatively, if the crosstalk samples have been previously determined they can be downloaded to the crosstalk registers 36 so that no learning phase is required.

The construction of the crosstalk cancellation signal will now be described with reference to FIGS. 3–6. The transmit shift register 24 holds the values of the bits transmitted during the last 11 clocks with b10 holding the bit value last transmitted and b0 holding the bit value transmitted 10 bit periods before.

Figure 6:
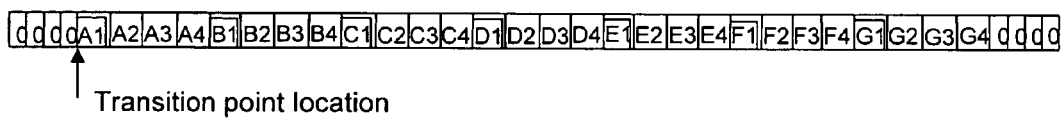
FIG. 6 is diagram depicting the samples characterizing a crosstalk signal due to a single transition.

FIG. 6 depicts the 28 samples which, in this example, characterize the crosstalk pulse resulting from a single bit transmission. The complete sample is divided into subgroups labeled Ai, Bi, Ci, Di, Ei, Fi, and Gi, where the index i has the values 1–4. Each of the subgroups includes four samples points of the complete sample set and corresponds to a set of samples that will be received during one bit period.

The construction of a crosstalk signal when successive bits are transmitted on the Tx line will now be described with reference to FIGS. 7 and 8. In this example, the crosstalk from the first bit transmitted arrives at the receiver at the time that the transmit bit is shifted to b8 as described above with reference to FIG. 3.

This means that when the b8 bit in the shift register switches to "1" the crosstalk signal on the Rx line at that time will have a crosstalk signal of amplitude Al and polarity +ve if the transition is from 0 to 1 and −ve if the transition is 1 to 0. If there is no transition then the crosstalk value is 0.

FIG. 7 schematically depicts the contributions to the crosstalk signal for the bit period containing $t_1$ when a bit is received at time $t_1$. The Subgroup A samples were generated by the bit transmitted two bit periods ago, i.e., the bit stored in b8 of the shift register, the Subgroup B samples were generated by the bit transmitted three bit periods ago, i.e., the bit stored in b7 of the shift register, and so on. The crosstalk is then the sum of an A subgroup sample multiplied by the bit value stored in b8, a B subgroup sample multiplied by the bit value stored in b7, and so on.

As described above, the stored bit values are either +1, −1, or 0 depending on whether a positive transition, negative transition, or no transition was transmitted.

Figure 8:
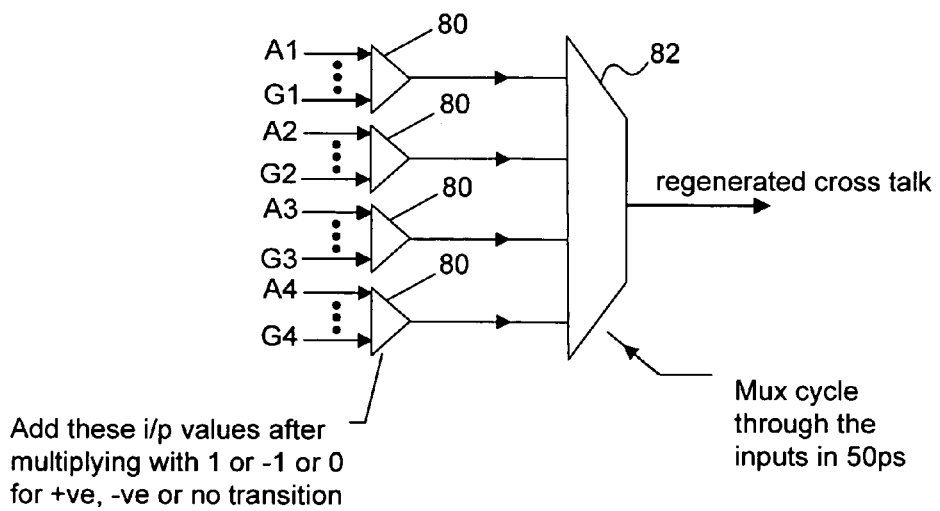
FIG. 8 is a block diagram depicting the logic for generating the crosstalk cancellation signal.

FIG. 8 schematically depicts an embodiment of the logic for generating the actual crosstalk cancellation signal from the samples collected during the crosstalk characterization process. As described above, there are four sampling periods of 50 ps. each for each bit period occurring at $t_1$, $t_2$, $t_3$, and $t_4$. Thus, as depicted in FIG. 7, at $t_0$ $A_1$–$G_1$, which are all received at $t_0$, weighted by their bit values are summed, at $t_1$ $A_2$–$G_2$ are summed, and so on.

Thus, for $t_1$ the bit period the samples which contribute to the crosstalk are $A_1$, $B_1$, $C_1$, $D_1$, $E_1$, $F_1$ and $G_1$. For $A_x$ the multiplier is derived from bits b8 and b7, for $B_x$ bits b7 and b6, for $C_x$ bits b6 and b5, for $D_x$ bits b5 and b4, for $E_x$ bits b4 and b3, for $F_x$ b3 and b2, for $G_x$ b2 and b1.

At $t_2 = t_1 + 50$ ps. values are calculated using $A_2$, $B_2$ ... in same way. And so on until $t_4$ where values are calculated using $A_4$, $B_4$. After $t_4$, since the registers shift by one bit total, crosstalk is calculated using $A_1$, $B_1$, ... etc. and the new multiplier will give crosstalk for points after $t_4$.

In FIG. 8 there are four summing elements 80 for summing the weighted sampling points for each sampling period and a multiplexing element 82, clocked at the sampling clock rate of 20 Gbit/sec, for generating the crosstalk cancellation signal.

Referring back to FIG. 4, note that the peak of the crosstalk is detected to the accuracy of one bit period. Therefore, it cannot be determined whether the actual peak occurred at sampling period at $t_1$, $t_2$, $t_3$, or $t_4$ within the b5 bit period.

Accordingly, as depicted in FIG. 6, a few more sample points are added before and after the collected values to form the modified crosstalk table which allows sliding the sample window in the table to match the actual position of the NEXT peak to minimize residue. Also more points are sampled so that no samples with significant amplitude are lost due to sliding.

Thus a NEXT cancellation system has been described which is simple to implement, can use a Bi-CMOS process, uses low power and is extremely fast, can use pre-loaded control (no learning), and has low latency.

The invention has now been described with reference to the preferred embodiments. Alternatives and substitutions will now be apparent to persons of ordinary skill in the art. For example, the particular order of conversion of signals between analog and digital formats is not critical to practicing the invention. Different ratios between the bit period and sampling period may be utilized depending on the type of environment. Accordingly, it is not intended to limit the invention except as provided by the appended claims.

What is claimed is:

1. A system for cancelling NEXT comprising:
a transmit bit shift register, clocked at a bit transition rate, for holding a plurality of successively transmitted transmit bit values;
a plurality of sample registers for holding a group of crosstalk samples characterizing a NEXT signal due to a single transmitted bit value;

a combination unit, coupled to the transmit bit shift register and sample registers, for constructing a crosstalk cancellation signal based on the crosstalk samples and successively transmitted transmit bit values; and a subtractor, coupled to receive the crosstalk cancellation signal and a received signal, for subtracting the crosstalk cancellation signal from the received signal to remove NEXT.

2. The system of claim 1 with the group of samples divided into subgroups generated by successive transmitted bit values and with the combination unit further comprising:

multiplying elements, coupled to the sampling registers, for multiplying each crosstalk sample in a subgroup by a corresponding transmit bit value in the transmit bit shift register which generates the subgroup to form a weighted subgroup;

adding elements that sum respective samples from each weighted subgroup to form a set of crosstalk cancellation sub-signals; and a multiplexer, coupled to the adding elements, that multiplexes the crosstalk cancellation sub-signals at sampling rate, being a multiple of the bit transition rate, to form the crosstalk cancellation signal.

3. A method for cancelling NEXT comprising the steps of:

characterizing the NEXT from a single transition by sampling the NEXT signal at a sampling rate being a multiple of a bit transmission rate;

storing a set of crosstalk samples characterizing the NEXT signal for a single transition;

storing the transmit bit values of successively transmitted bits;

for a bit currently being received, generating a NEXT cancellation signal by combining the stored transmitted bit values and crosstalk samples to properly weight the NEXT contribution from each previously transmitted bit to form weighted crosstalk samples and sum the weighted crosstalk samples to form a NEXT cancellation signal; and subtracting the next cancellation signal from a received signal to remove NEXT.

4. The method of claim 3 where the step of generating a NEXT cancellation signal further comprises:

for each transmit bit value stored that contributes to NEXT, multiplying a subgroup of crosstalk samples by the transmit bit value that generates the subgroup of crosstalk samples to form a weighted subgroup of crosstalk samples;

for each sampling period, summing a corresponding weighted bit value from each subgroup to form a crosstalk cancellation sub-signal; and multiplexing the crosstalk cancellation sub-signals at the sampling rate to form the crosstalk cancellation signal.

5. The method of claim 4 where the step of storing a set of crosstalk samples comprises the steps of:

transmitting a first single bit value;

determining the delay in receiving a crosstalk signal peak in units of bit periods;

transmitting a second single bit value and sampling during bit periods occurring before and after the receipt of the crosstalk signal peak to collect crosstalk samples.

6. The method of claim 5 further comprising the step of:

sliding a window defining the subgroups of crosstalk samples to compensate for peak detection delay error.

7. A system for cancelling NEXT comprising:

means for characterizing the NEXT from a single transition by sampling the NEXT signal at a sampling rate being a multiple of a bit transmission rate;

means for storing a set of crosstalk samples characterizing the NEXT signal for a single transition;

means for storing the transmit bit values of successively transmitted bits;

means for generating a NEXT cancellation signal, for a bit currently being received, by combining the stored transmitted bit values and crosstalk samples to properly weight the NEXT contribution from each previously transmitted bit to form weighted crosstalk samples and sum the weighted crosstalk samples to form a NEXT cancellation signal; and means for subtracting the next cancellation signal from a received signal to remove NEXT.

8. The system of claim 7 where the means for generating a NEXT cancellation signal further comprises:

means for multiplying, for each transmit bit value stored that contributes to NEXT, a subgroup of crosstalk samples by the transmit bit value that generates the subgroup of crosstalk samples to form a weighted subgroup of crosstalk samples;

means for summing, for each sampling period, a corresponding weighted bit value from each subgroup to form a crosstalk cancellation sub-signal; and means for multiplexing the crosstalk cancellation sub-signals at the sampling rate to form the crosstalk cancellation signal.

9. The system of claim 8 where the means for storing a set of crosstalk samples comprises:

means for transmitting a first single bit value;

means for determining the delay in receiving a crosstalk signal peak in units of bit periods;

means for transmitting a second single bit value and sampling during bit periods occurring before and after the receipt of the crosstalk signal peak to collect crosstalk samples.

10. The system of claim 9 further comprising:

means for sliding a window defining the subgroups of crosstalk samples to compensate for peak detection delay error.

* * * * *